(12) United States Patent
Houle et al.

(10) Patent No.: US 10,167,069 B2
(45) Date of Patent: Jan. 1, 2019

(54) MOUNTING AND ACTUATION DEVICE

(71) Applicant: SIDESHIFT INC., Ontario (CA)

(72) Inventors: Mark Houle, Ontario (CA); Robert Griffin, Ontario (CA); Norman Boulard, Louisville, KY (US)

(73) Assignee: SIDESHIFT INC., Carleton Place, Ontario (CA)

( * ) Notice: Subject to any disclaimer, the term of this patent is extended or adjusted under 35 U.S.C. 154(b) by 0 days.

(21) Appl. No.: 15/559,293

(22) PCT Filed: Mar. 18, 2016

(86) PCT No.: PCT/CA2016/050308
§ 371 (c)(1),
(2) Date: Sep. 18, 2017

(87) PCT Pub. No.: WO2016/145537
PCT Pub. Date: Sep. 22, 2016

(65) Prior Publication Data
US 2018/0057130 A1    Mar. 1, 2018

Related U.S. Application Data

(60) Provisional application No. 62/135,098, filed on Mar. 18, 2015.

(51) Int. Cl.
*F16H 21/44*   (2006.01)
*B63H 20/06*   (2006.01)
(Continued)

(52) U.S. Cl.
CPC .............. *B63H 20/06* (2013.01); *B63H 5/20* (2013.01); *B63H 20/08* (2013.01); *B63H 25/42* (2013.01);
(Continued)

(58) Field of Classification Search
CPC ......... F16H 20/06; F16H 21/44; B63H 20/06; B63H 5/20
See application file for complete search history.

(56) References Cited

U.S. PATENT DOCUMENTS 3,550,547 A * 12/1970 Pleuger .................... B63H 5/14
                                                    114/151
3,587,512 A *  6/1971 Patterson ............. B63H 20/007
                                                    114/153
(Continued)

FOREIGN PATENT DOCUMENTS

EP    2757037      7/2014
WO    2008/133494  11/2008

OTHER PUBLICATIONS

International Search Report and Written Opinion, PCT International Application No. PCT/CA2016/050308, PCT/ISA/210, PCT/ISA/237, dated Jun. 9, 2016.

*Primary Examiner* — David M Fenstermacher
(74) *Attorney, Agent, or Firm* — Saliwanchik, Lloyd & Eisenschenk

(57) ABSTRACT

In at least one embodiment the present invention provides an improved mounting and actuation device having a mounting body defining a stowage cavity and an actuation arm operable for movement from a first stowed position to a second actuated position, the actuation arm operably connected to the mounting body at a first proximal end and having a second distal end having a mounting surface adapted to receive an accessory wherein the actuation arm is received in the stowage cavity in the first stowed position.

13 Claims, 10 Drawing Sheets

(51) Int. Cl.
  *B63H 25/42* (2006.01)
  *B63H 20/08* (2006.01)
  *B63H 5/20* (2006.01)
  *F15B 15/06* (2006.01)

(52) U.S. Cl.
  CPC ............ *F15B 15/06* (2013.01); *F16H 21/44* (2013.01); *B63B 2755/00* (2013.01)

(56) References Cited

U.S. PATENT DOCUMENTS

| | | | |
|---|---|---|---|
| 4,294,186 A | 10/1981 | Wardell | |
| 4,668,195 A * | 5/1987 | Smith | B63H 20/04 440/54 |
| 4,878,864 A | 11/1989 | Van Bentem | |
| 5,152,240 A * | 10/1992 | Fontanille | B63H 25/42 114/151 |
| 5,476,400 A * | 12/1995 | Theophanides | B63H 23/26 440/5 |
| 5,836,794 A | 11/1998 | Krueger | |
| 6,280,267 B1 | 8/2001 | Griffith, Sr. et al. | |
| 6,520,813 B1 * | 2/2003 | DeVito, Jr. | B63H 20/007 114/285 |
| 7,146,921 B2 * | 12/2006 | Fontanille | B63H 25/42 114/151 |
| 7,150,662 B1 | 12/2006 | Janitz | |
| 7,381,108 B1 * | 6/2008 | Salmon | B63B 39/061 114/285 |
| 8,007,328 B2 * | 8/2011 | Williams | B63H 20/08 114/151 |
| 8,353,734 B1 * | 1/2013 | Williams | B63H 21/165 114/151 |
| 8,382,538 B1 * | 2/2013 | Williams | B63H 23/26 114/151 |
| 9,738,364 B2 | 8/2017 | Abney | |
| 2003/0029368 A1 * | 2/2003 | DeVito, Jr. | B63H 20/007 114/145 A |
| 2010/0116967 A1 * | 5/2010 | Todd | B63H 20/007 248/642 |
| 2017/0001698 A1 * | 1/2017 | Schmidtke | B63H 23/24 |

* cited by examiner

MOUNTING AND ACTUATION DEVICE

CROSS-REFERENCE TO RELATED APPLICATIONS

This is a national stage application of International Application No. PCT/CA2016/050308, filed Mar. 18, 2016, which claims priority to and the benefit of U.S. Provisional Patent Application No. 62/135,098, filed on Mar. 18, 2015, the disclosures of both of which are incorporated herein by reference in their entirety, including any figures, tables, and drawings.

FIELD

The present invention relates to mounting and actuation devices. More specifically, the present invention relates to a mounting and actuation device for mounting a variety of accessories to a variety of mounting structures in a secure and robust manner, such as mounting a transversal thruster to the underside of a marine vehicle.

BACKGROUND

In a wide variety of applications it is desirable to move an accessory from a first, stowed position to a second, actuated position. Therefore, a wide variety of mounting and actuating devices have been developed for mounting a variety of accessories to variety of structures depending on needs of the particular application.

However, in some applications, available prior art mounting and actuation devices are not well suited to the needs of the particular application. For example, in some embodiments, significant forces are generated by the accessory when it is in the deployed position and as such the mounting and actuation device must be sufficiently robust to withstand the applied forces.

In other situations, the mounting and actuation device must be able to withstand harsh weather conditions, or be suitable for securing themselves to a wide variety of mounting surfaces.

Accordingly, there is a need for a mounting and actuation device for mounting a variety of accessories to a variety of mounting structures in a secure and robust manner.

BRIEF SUMMARY

In at least one embodiment, it is contemplated that the present invention can provide a mounting and actuation device for mounting a variety of accessories to a variety of mounting structures.

In at least one embodiment the present invention provides an improved mounting and actuation device having a mounting body, the mounting body having a first end and a second end and defining a stowage cavity and an actuation arm operable for movement from a first stowed position to a second actuated position, the actuation arm operably connected to the mounting body at a first proximal end, the actuation arm having a second distal end, the second distal end having a mounting surface adapted to receive an accessory wherein the actuation arm is received in the stowage cavity in the first stowed position.

BRIEF DESCRIPTION OF THE FIGURES

The present invention will be better understood in connection with the following Figures, in which.

DETAILED DESCRIPTION OF THE EMBODIMENTS

Figure 1:
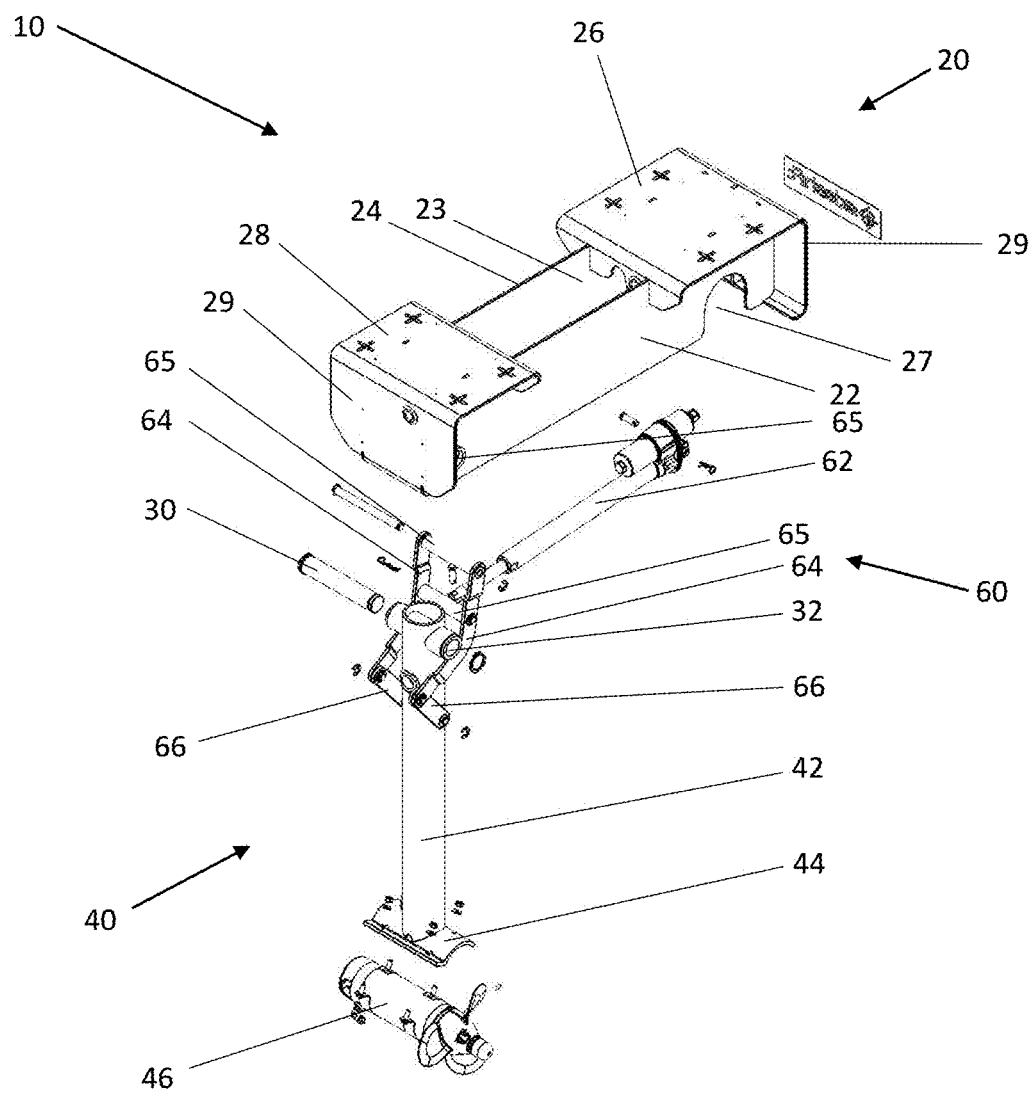
FIG. 1 is an exploded perspective view of an improved mounting and actuation device in accordance with at least one embodiment of the present invention.

It is contemplated that the present invention can provide a mounting and actuation device for mounting a variety of accessories to a variety of mounting structures. In at least one embodiment, it is contemplated that the present invention can provide an improved mounting and actuation device that is suitable for mounting a transverse thruster (such as a bow or stern thruster) to the underside of a marine vehicle (such as a pontoon boat) for deployment into and out of the water.

It will be readily appreciated that any component of the present invention discussed herein can be formed of any suitable material (including, but not limited to, aluminum, galvanized steel, carbon fibre and stainless steel) and by any suitable manufacturing technique (including, but not limited to, stamping, milling, molding or casting) as will be readily appreciated by the skilled person. Further, it will be readily appreciated that all components of the present invention can be arranged in any suitable dimensions as required by the particular end user application.

It is contemplated that the present invention can be used to mount a wide variety of accessories to a wide variety of surfaces. Suitable accessories include, but are not limited to, flood lights, marine instruments and accessories, hydraulic motors, electric motors (e.g., trolling motors and transverse thrust motors), cameras (e.g., underwater cameras) or monitoring devices (e.g., sonar), and control surfaces (e.g., rudders), and any other suitable accessory, while suitable mounting surfaces include, but are not limited to, docks, marine vehicles, recreational vehicle, decks, roofs, fences and soffits, among any other suitable mounting surface as will be readily appreciated by the skilled person. In at least one embodiment it is contemplated that the accessory is a pivotable electric or hydraulic motor that can be used as a low speed (i.e., trolling) propulsion motor or a transverse thrust motor, depending on the orientation of the electric motor relative to the fore-aft axis of the boat, as will be readily appreciated by the skilled person.

It is further contemplated that the present invention can be formed of separate components suitably joined together (by way of, for example, mechanical fasteners or adhesives) or alternatively it is contemplated that present invention can be formed of a single unitary component.

All pivoting components discussed herein can be arranged in any suitable manner as will be appreciated by the skilled person. In at least one embodiment, it is contemplated that the two components that pivot relative to one another can be joined together using any suitable bearing arrangement as required by the particular end user application, However, it is also contemplated that pivoting components can be joined together by a bushing arrangement or any other suitable construction as required by the particular end user application.

In at least one embodiment, the present invention can provide an improved mounting and actuation device that has a mounting body defining a stowage cavity and an actuation arm operable for movement from a first stowed position to a second actuated position. The actuation arm is operably connected to the mounting body at a first proximal end and has a second distal end. The second distal end has a mounting surface that is adapted to receive an accessory. Further, the actuation arm is received in the stowage cavity in the first stowed position, and is outside of the stowage cavity when in the second actuated position.

It is contemplated that the actuation arm can take a variety of forms, including a longitudinally extending, single pivoting actuation arm, a telescoping actuation arm or a multiple pivoting, folding actuating arm among any other suitable arrangement. In at least one embodiment it is contemplated that the actuation arm is a longitudinally extending, single pivoting actuation arm having a first proximal end that is pivotably connected to one end of the mounting body. In at least one embodiment it is contemplated that a second distal end of the actuation arm can have a mounting surface for receiving the accessory. In at least one alternative embodiment, it is contemplated that the actuation arm is at least two, axially aligned and rotatably coupled arms that facilitate rotation of an accessory attached to the distal end of the most distally positioned arm.

In some embodiments, it is contemplated that actuation means are required to actuate the actuation arm from the first stowed position to the second actuated position. It is contemplated that the actuation means can take a variety of forms, including but not limited to a hydraulic cylinder or a linear actuator (e.g., a mechanical, hydraulic, pneumatic, or actuator), among other actuation means that will be readily appreciated by the skilled person.

In some embodiments, it is contemplated that the actuation means will further comprise at least one first linkage arm that is pivotably connected with at least one second linkage arm. One end of the first linkage arm can be pivotably connected to the actuator means, while one end of the second linkage arm can be pivotably connected to second linkage means. In this way as the actuator means is actuated from a first compressed position to a second extended position the first linkage arm and the second linked arm are moved in concert such that the actuation arm is moved from a first, stowed position to a second, actuated position as will be discussed in further detail below.

In at least one embodiment, it is contemplated that the at least one first linkage arm can be two first linkage arms that are connected to one another by way of at least one transverse connector. In some embodiments, it is contemplated that the at least one second linkage arm is two second linkage arms.

In at least one embodiment, it is contemplated that the mounting body has an upper mounting surface, a first side wall and a second side wall. Further, is some contemplated that the mounting body can include a first end wall and a second end wall. In some embodiments, the first side wall, the second side wall and (optionally), the first end wall and the second end wall define a stowage cavity that can receive the actuation arm when it is in the first, stowed position.

In some embodiments, it is contemplated that one or both of the side walls can have a cutout that is adapted to accommodate the mounted accessory when the actuation arm when it is in the first, stowed position.

In at least one embodiment, it is contemplated that locking means are provided that can secure the actuation arm in the first, stowed position in order to protect the entire assembly from dynamic loads that may be experienced when the actuation arm is stowed. It is contemplated that locking means can consist of, for example, a latch mechanism provided on the mounting body, a locking mechanism provided on the linear actuator, or a locking arrangement provided, in the linkage arm assembly, among other suitable arrangements that will be readily appreciated by the skilled person.

In at least one embodiment, it is contemplated that the actuation arm is a cylinder defining an interior channel. The interior channel can contain cables and/or wires for connecting the accessory to peripheral controls whereby the user can control the accessory from a remote position (such as in the boat to which the improved mounting and actuation device is attached). In addition, or in the alternative, it is contemplated that cables and/or wires extend from the actuation means to peripheral controls whereby the user can remotely control movement of the actuation arm between its first stowed position and its second actuated position. In alternative embodiments, it is contemplated that one or both of the accessory and the actuation means is controlled wirelessly.

Turning to FIGS. 1, 2, and 3A to 3E, at least one embodiment of an improved mounting and actuation device in accordance with the present invention is illustrated. In this embodiment, mounting and actuation device 10 includes a mounting body 20 that is operably connected to an actuation arm assembly 40. In this embodiment actuation arm assembly 40 includes an actuation arm 42 that is a longitudinally extending actuation arm that is pivotably connected to one end of mounting body 20. Actuation means 60 are provided that, in this embodiment, is a linear actuator 62.

In this embodiment, mounting body 20 has a first side wall 22 and second side wall 24 and at least one mounting surface. In at least one embodiment, the at least one mounting surface is a first mounting surface 26 and a second mounting surface 28, however, one or more than two mounting surfaces are also contemplated, as will be understood by the skilled person.

Figure 3:
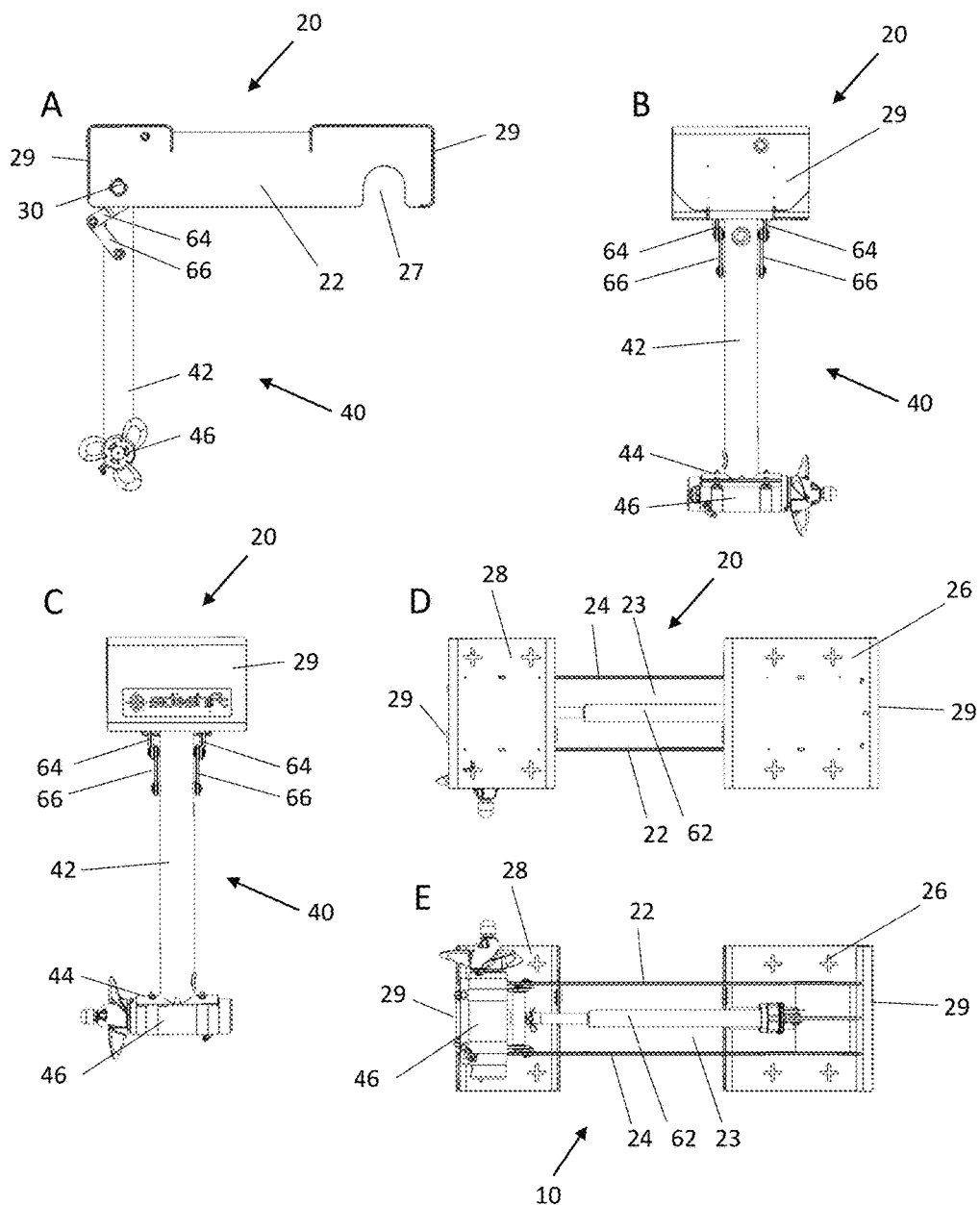
FIG. 3A is side elevation view of the improved mounting and actuation device of FIG. 1 in accordance with at least one embodiment of the present invention.
FIG. 3B is front elevation view of the improved mounting and actuation device of FIG. 1 in accordance with at least one embodiment of the present invention.
FIG. 3C is rear elevation view of the improved mounting and actuation device of FIG. 1 in accordance with at least one embodiment of the present invention.
FIG. 3D is top view of the improved mounting and actuation device of FIG. 1 in accordance with at least one embodiment of the present invention.
FIG. 3E is bottom elevation view of the improved mounting and actuation device of FIG. 1 in accordance with at least one embodiment of the present invention.

In this embodiment, first side wall 22 and second side wall 24 define a cavity 23 therebetween (and, more specifically the transverse breadth of cavity 23), as seen in FIG. 3E for receiving actuation arm assembly 40. In this embodiment, optional end wall plates 29 are provided that further define the longitudinal breadth of cavity 23.

In this embodiment, actuation arm 42 is pivotably connected to mounting body 20 at a first, proximal end and has an accessory mounting surface 44 at a second, distal end. More specifically, in this embodiment actuation arm 42 is pivotably connected to mounting body by way of an axle 30 that is received in corresponding holes 32 provided in both mounting body 20 and actuation arm 42, as can be seen in FIG. 1.

In this embodiment, an accessory is provided that is an electric motor 46 and accessory mounting surface 44 is configured for attachment to electric motor 46. As would be readily appreciated by a worker skilled in the art, in alternative embodiments, the accessory mounting surface can be configured for attachment to other accessory devices based on, for example, their geometry and mechanical requirements. Further, in this embodiment a cutout 27 is provided on at least one of the side walls 22, 24 in order to accommodate electric motor 46 when the actuation arm assembly 40 is in a first, stowed position within cavity 23.

As would be readily appreciated by a worker skilled in the art, although the Figures depict an electric motor attached to a single propeller, the accessory can be an electric motor attached to two propellers.

In this embodiment, actuation means 60 includes at least one first linkage arm that is pivotably connected to mounting body 20 at a first end and pivotably connected to at least one second linkage arm at a second end. The at least one second linkage arm is further pivotably connected to the actuation arm 42 at the second end.

As can be seen in FIG. 1, in this embodiment the at least one first linkage arm is two first linkage arms 64 that are connected by way of at least one transverse connector, which in this embodiment, is two transverse connectors 65. Further, in this embodiment the at least one second linkage arm is two second linkage arms 66.

In this embodiment, first linkage arm 64 has a generally arcuate or curved shape, however, it is contemplated that both the first linkage arm 64 and second linkage arm 66 can take any shape that is required by the particular geometry of the specific end-user application, as will be readily appreciated by the skilled person.

It is contemplated that in at least one embodiment a first, proximal end of actuation arm 62 is pivotably connected to mounting body 20 and a second, distal end of actuation arm 62 is pivotably connected to actuation arm assembly 40.

In this embodiment and as seen in FIGS. 1 and 3E, the second, distal end of actuation arm 62 is pivotably connected to first linkage arm 64 at a position located between the first end and second end of linkage arm 64. More specifically, in this embodiment the second, distal end of linear actuator 62 is connected to transverse connector 65, which is in turn connected to first linkage arm 64 at a position located between the first end and second end of linkage arm 64, however, other arrangements will be readily contemplated by the skilled person.

Figure 2:
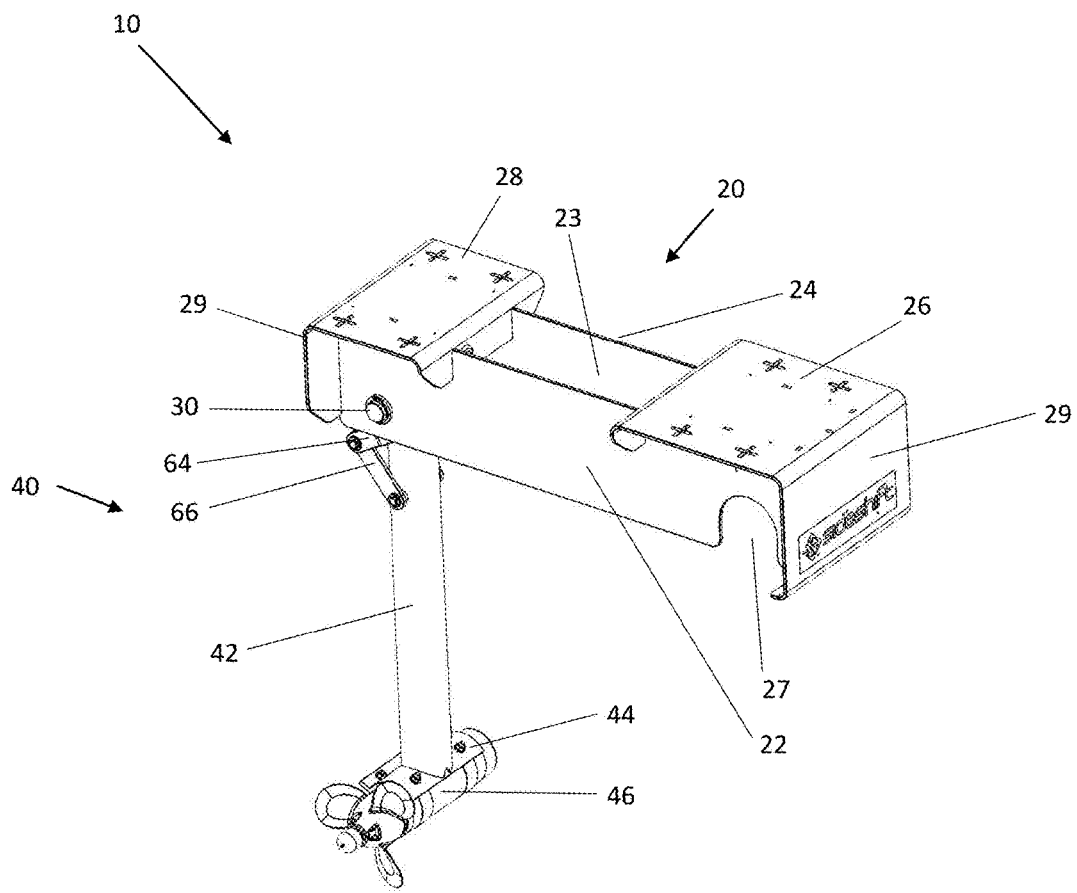
FIG. 2 is a perspective view of the improved mounting and actuation device of FIG. 1 in accordance with at least one embodiment of the present invention.

In this way, and as will be readily understood by the skilled person, as linear actuator 62 is actuated from a first, compressed position to a second, extended position, linear actuator 62 will in turn act on first linkage arm 64 to pivot first linkage arm 64 relative to mounting body 20 and in turn pivot second linkage arm 66 which will act to pivot actuation arm 42 about pivot means 30 from a first, stowed position to the second, actuated position shown in FIGS. 2 and 3A.

As discussed above, in all of the arrangements discussed herein where one component pivots relative to another component it is contemplated that any suitable pivoting connection can be used, including but not limited to, axles supported by bearings, axles supported by bushings, among any other arrangement that will be readily appreciated by the skilled person.

In this way, and as will be readily appreciated by the skilled person, the present invention provides an improved mounting and actuation device, wherein an accessory mounted to an actuation arm can be deployed from a first, stowed position to a second, actuated position.

FIGS. 4, 5, 6A-E, 7, 8A-F and 9 illustrates at least one alternative embodiment of an improved mounting and actuation device in accordance with the present invention. This embodiment is similar to the at least one embodiment illustrated in FIGS. 1, 2 and 3A-E, except that actuation device 100 comprises mounting body 120 that is specifically configured and dimensioned for mounting to a surface where there is limited space, such as between the pontoons of a pontoon boat.

In this embodiment, mounting and actuation device 100 includes a mounting body 120 that is operably connected to an actuation arm assembly 140. In this embodiment actuation arm assembly 140 includes an actuation arm 142 that is a longitudinally extending actuation arm that is pivotably connected to one end of mounting body 120. As in the embodiment shown in FIGS. 1, 2 and 3A-E, mounting and actuation device 100 includes a linear actuator (partially shown).

Figure 4:
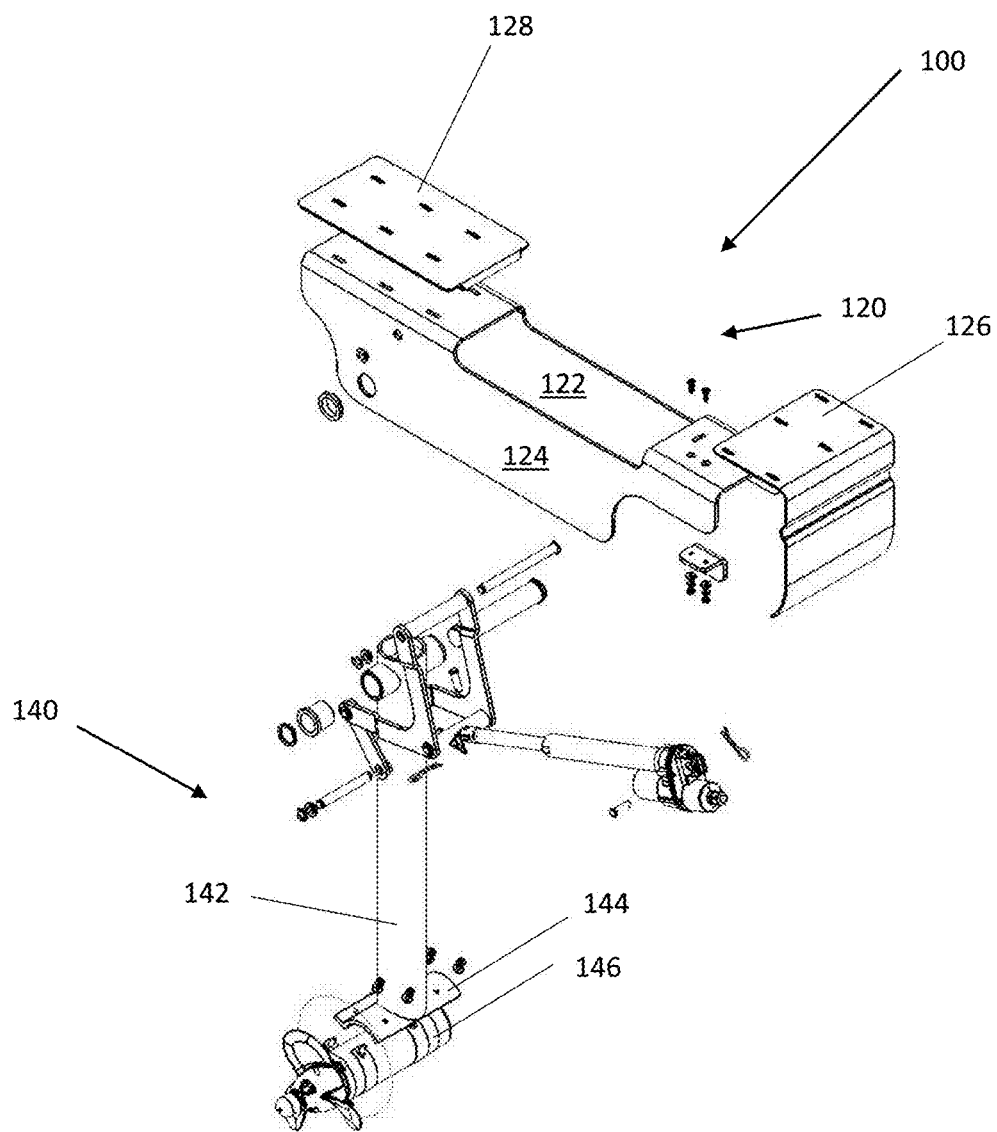
FIG. 4 is an exploded perspective view of an improved mounting and actuation device for use in small spaces, in accordance with at least one embodiment of the present invention.

In this embodiment, mounting body 120 has a first side wall 122 and a second side wall 124 and at least one mounting surface. First side wall 122 and second side wall 124 define a cavity 123 therebetween (and, more specifically, the side walls define the transverse breadth of cavity 123), as shown in FIG. 4, for receiving actuation arm assembly 140. The transverse breadth of cavity 123 is determined, at least in part, based on the available space available on the surface to which mounting and actuation device 100 is to be mounted. For example, the transverse breadth is selected in order to facilitate installation of mounting and actuation device 100 between the pontoons of a pontoon boat. Components of mounting and actuation device 100 are dimensioned as appropriate based on the selected transverse breadth of cavity 123.

In this embodiment, as illustrated in FIG. 4, the at least one mounting surface is a first mounting surface 126 and a second mounting surface 128, however, one or more than two mounting surfaces are also contemplated, as will be understood by the skilled person.

Figure 9:
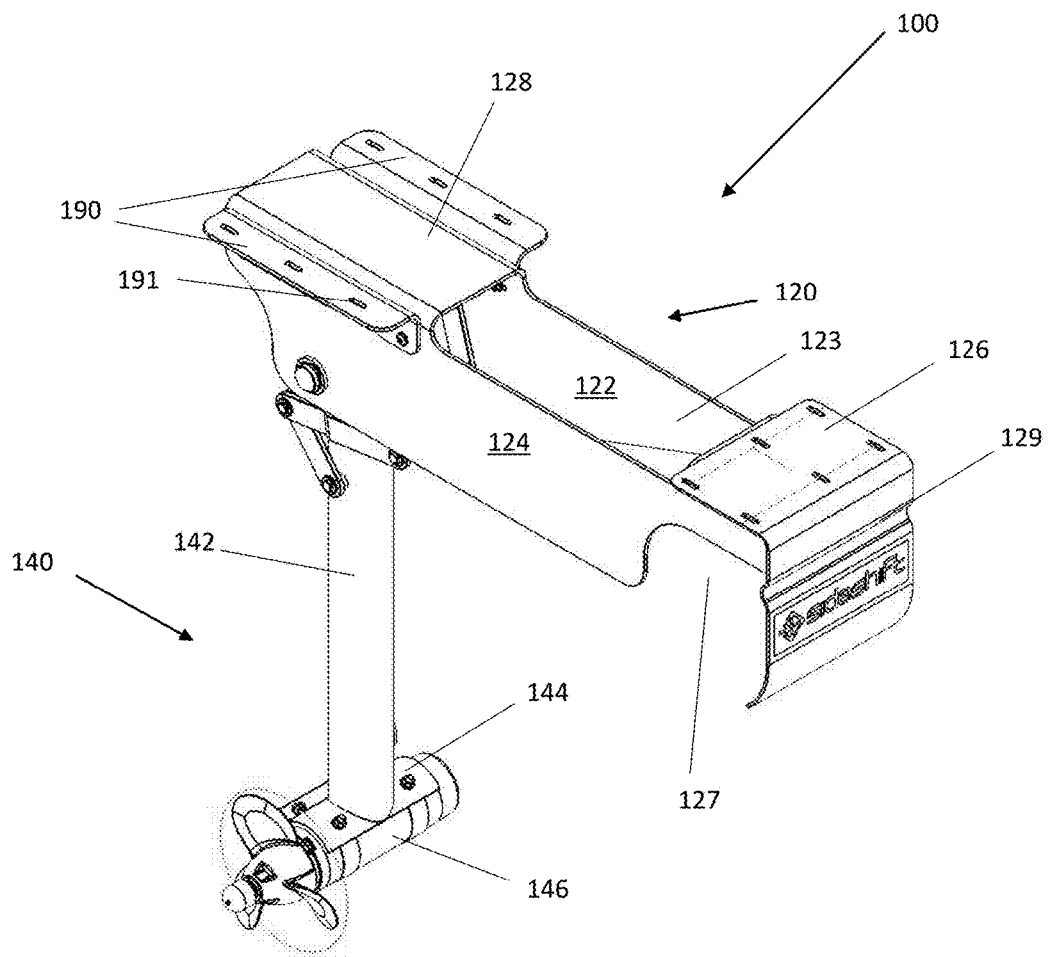
FIG. 9 is a perspective view of an improved mounting and actuation device for use in small spaces, in accordance with at least one alternative embodiment of the present invention.

In one alternative of this embodiment, as illustrated in FIG. 9, second mounting surface 128 comprises two, optional, outwardly projecting and longitudinally extending flanges 190, each of which comprises at least one hole 191 for receiving fastening means for attaching mounting and actuation device 100 to a surface.

In this embodiment, optional end wall plate 129 is provided at a first end of cavity 123 opposite from the second end of cavity 123, where actuation arm 142 is pivotably connected to mounting body 120. It is contemplated that in at least one embodiment an additional end plate is provided at the second end of cavity 123.

In this embodiment, actuation arm 142 is pivotably connected to mounting body 120 at a first, proximal end of actuation arm 142 and has an accessory mounting surface 144 at a second, distal end of actuation arm 142. As in the previously described embodiments, in this embodiment, an accessory is provided that is an electric motor 146 and accessory mounting surface 144 is configured for attachment to electric motor 146. As would be readily appreciated by a worker skilled in the art, in alternative embodiments, the accessory mounting surface can be configured for attachment to other accessory devices based on, for example, their geometry and mechanical requirements. Further, in this embodiment a cutout 127 is provided on at least one of the side walls 122, 124 in order to accommodate electric motor 146 when the actuation arm assembly 140 is in a first, stowed position within cavity 123.

In at least one embodiment, it is contemplated that that the present invention can provide an improved mounting and actuation device that can mount an electric transverse thruster to the undersurface of a pontoon boat, such that the electric transverse thruster can be deployed from a first, stowed position to a second, actuated position wherein the electric transverse structure is deployed into the water and can be used to provide transverse thrust for a marine vehicle for use in docking and delicate maneuvering situations.

Figure 10:
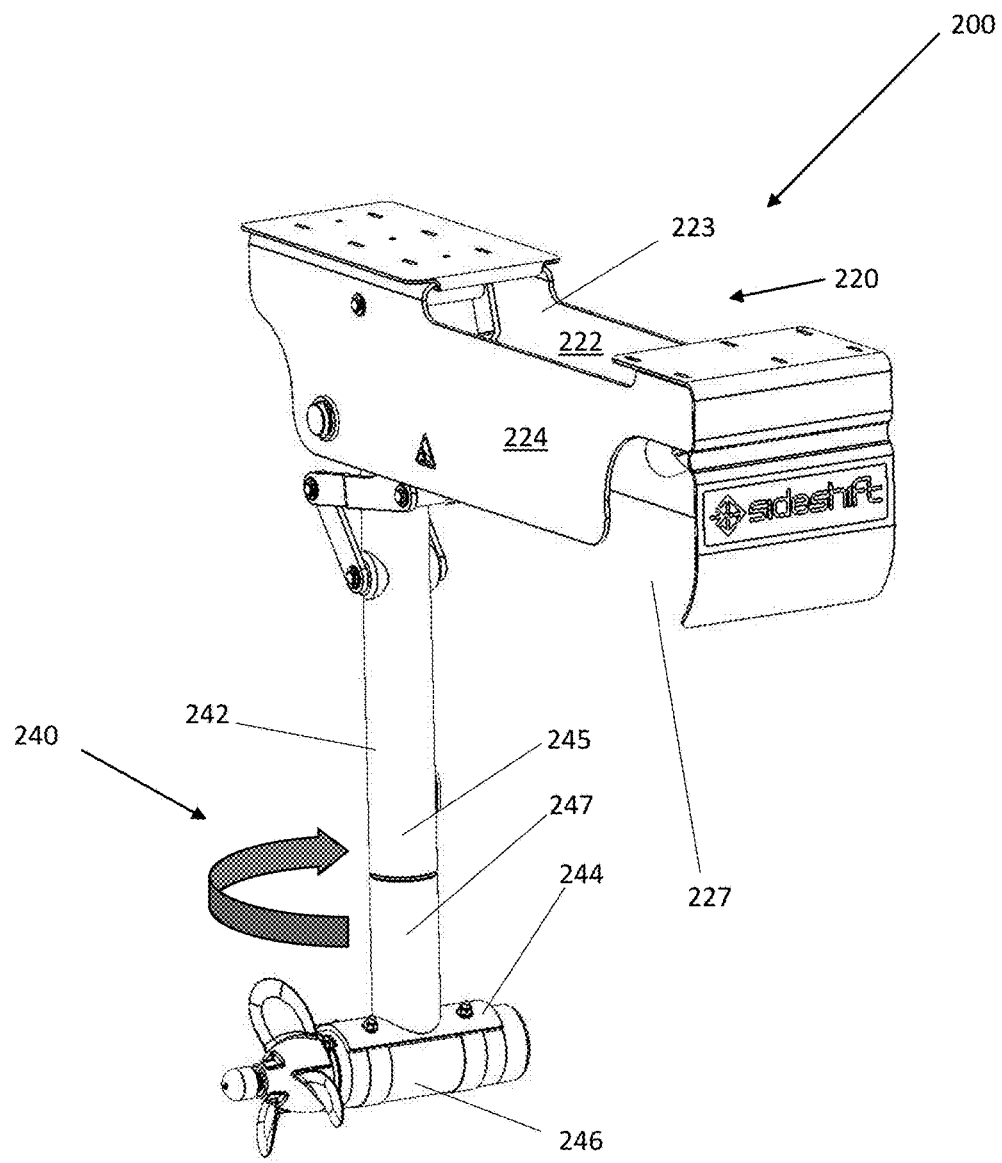
FIG. 10 is a perspective view of an improved mounting and actuation device having a rotatable or pivotable accessory, in accordance with at least one embodiment of the present invention.

FIG. 10 illustrates at least one embodiment of a mounting and actuation device 200 in which the accessory is a pivotable electric motor that can be used as a low speed (i.e., trolling) propulsion motor or a transverse thrust motor, depending on the orientation of the electric motor relative to the fore-aft axis of the boat, as will be readily appreciated by the skilled person.

Figure 5:
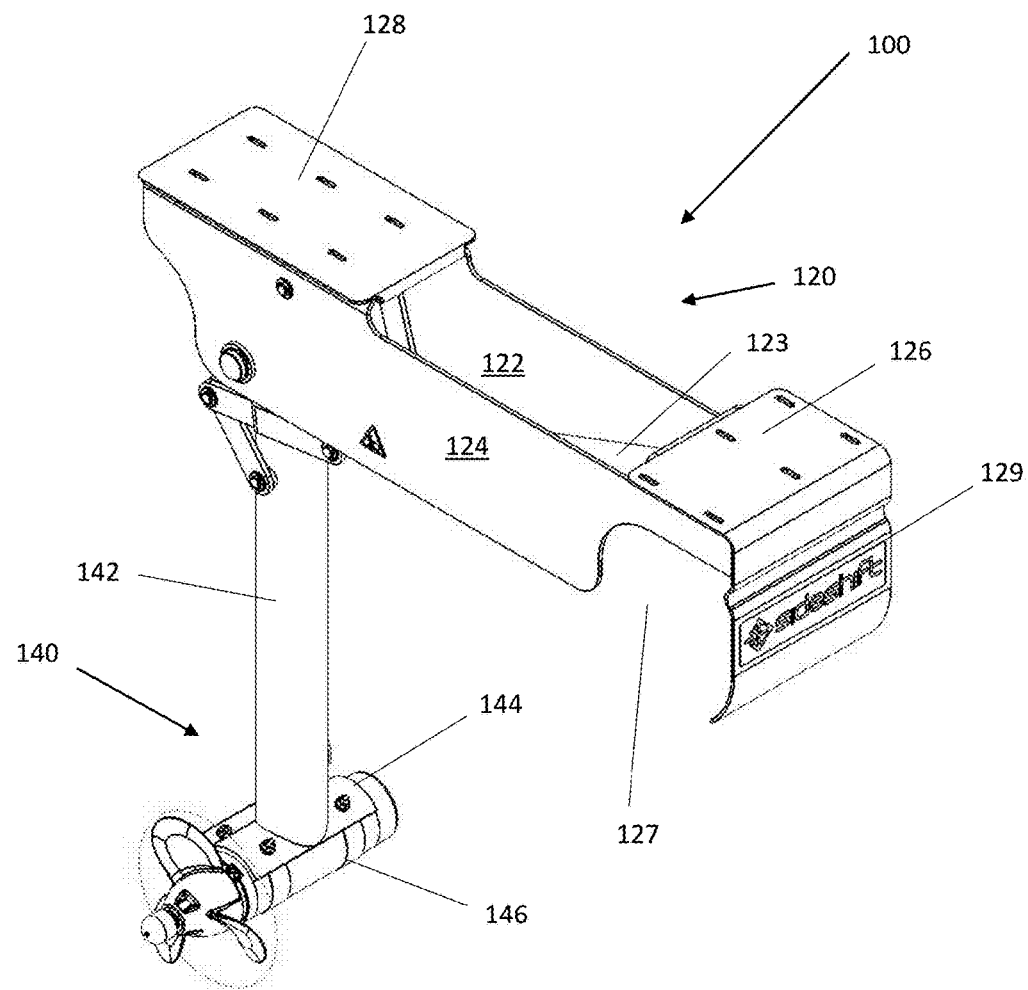
FIG. 5 is a perspective view of the improved mounting and actuation device of FIG. 4 in accordance with at least one embodiment of the present invention.
Figure 6:
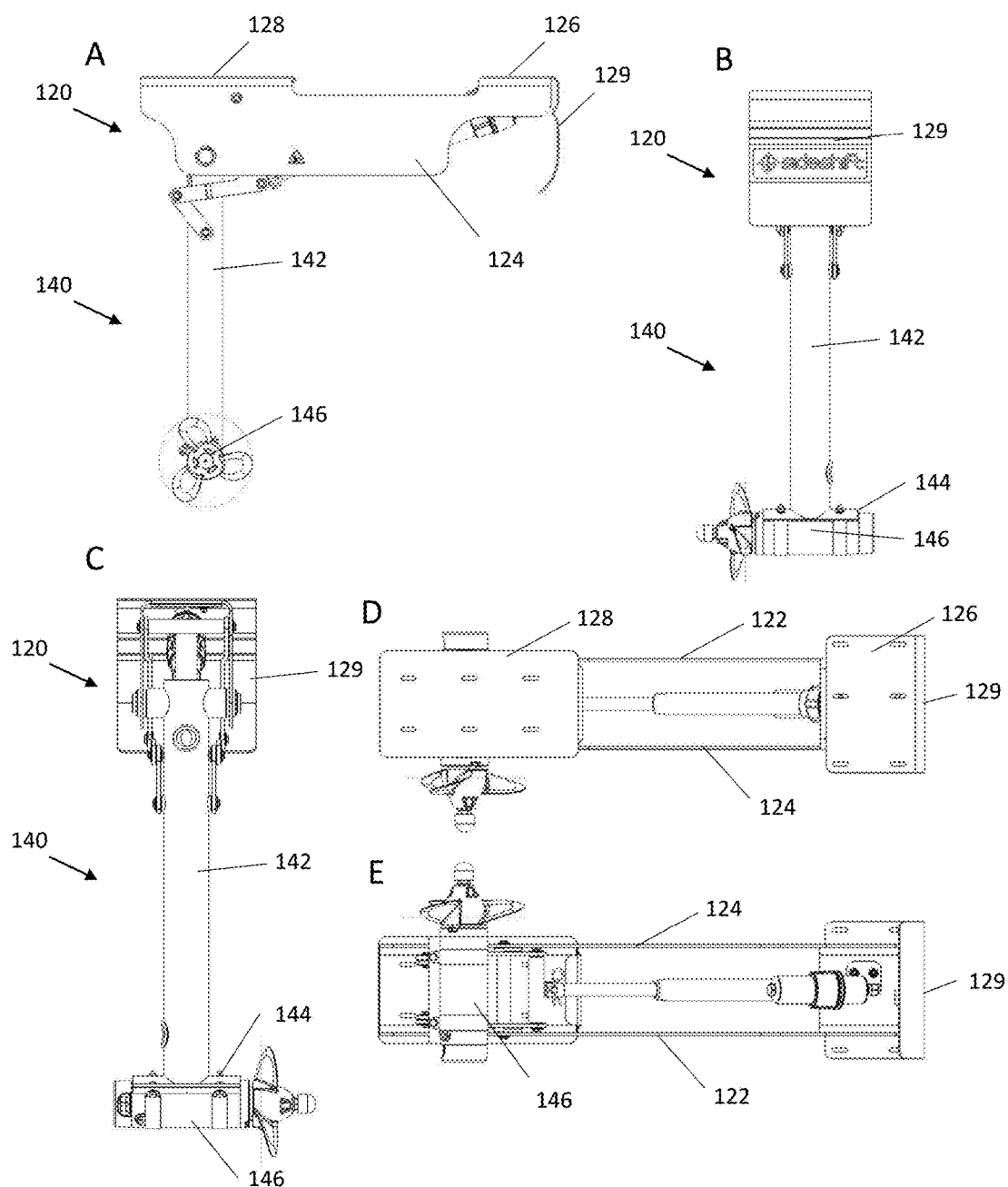
FIG. 6A is a side elevation view of the improved mounting and actuation device of FIG. 4 in accordance with at least one embodiment of the present invention.
FIG. 6B is a front elevation view of the improved mounting and actuation device of FIG. 4 in accordance with at least one embodiment of the present invention.
FIG. 6C is a rear elevation view of the improved mounting and actuation device of FIG. 4 in accordance with at least one embodiment of the present invention.
FIG. 6D is a top view of the improved mounting and actuation device of FIG. 4 in accordance with at least one embodiment of the present invention.
FIG. 6E is a bottom elevation view of the improved mounting and actuation device of FIG. 4 in accordance with at least one embodiment of the present invention.
Figure 7:
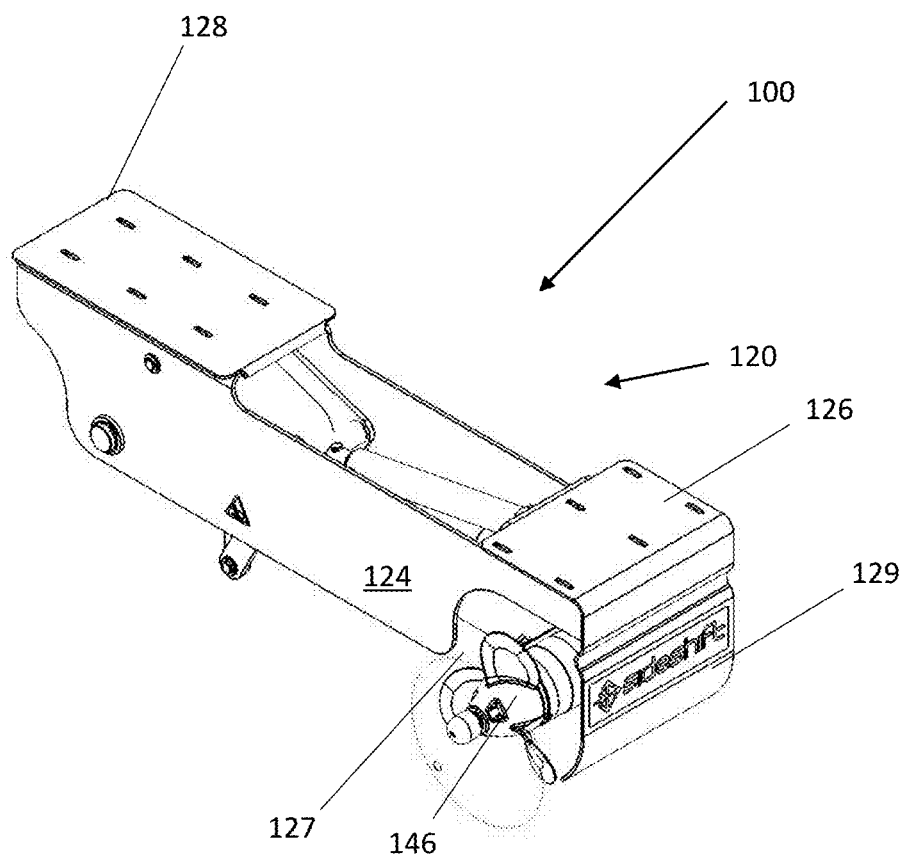
FIG. 7 is a perspective view of the improved mounting and actuation device of FIG. 4 with the actuation arm in its stowed position, in accordance with at least one embodiment of the present invention.
Figure 8:
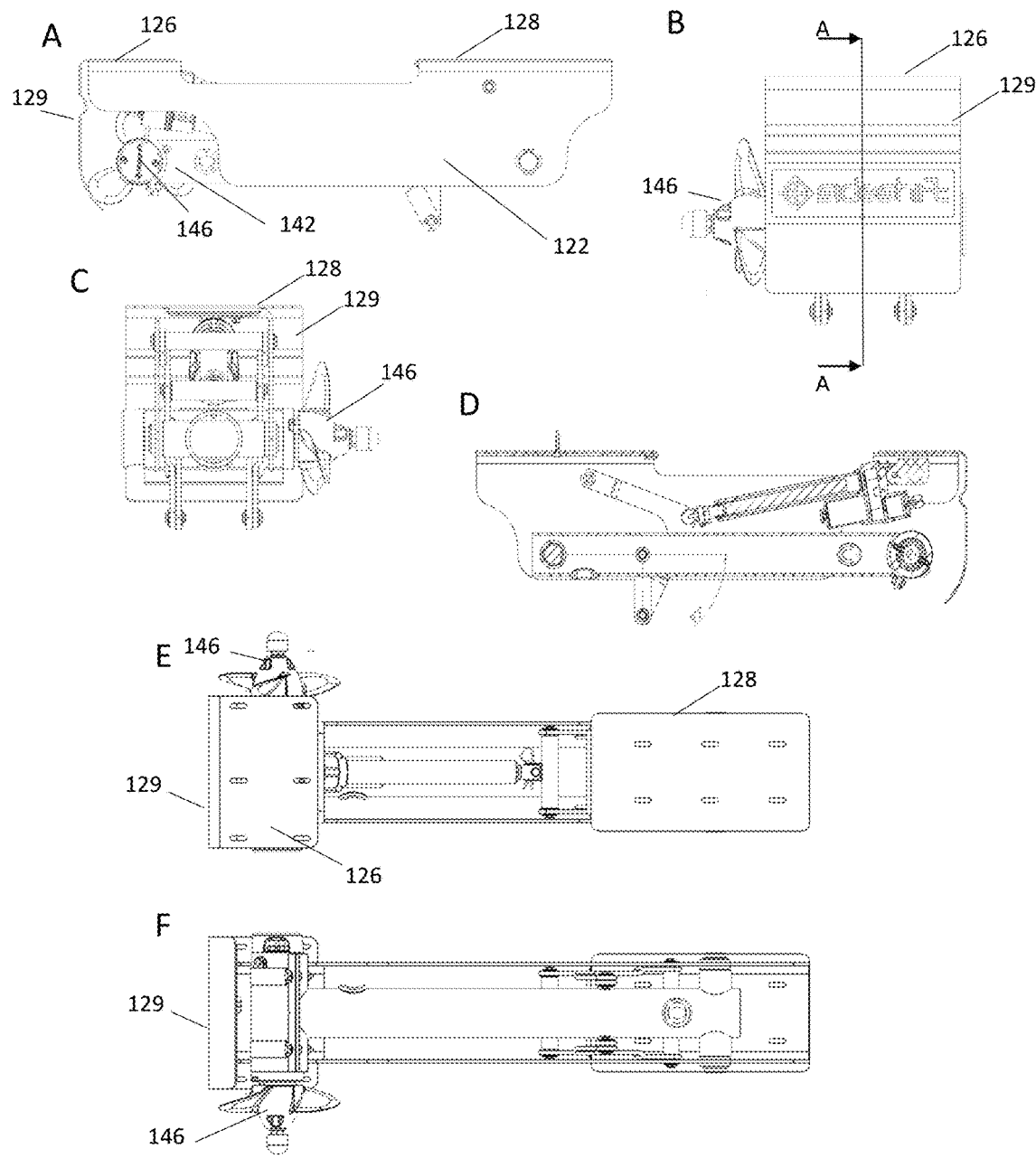
FIG. 8A is side elevation view of the improved mounting and actuation device of FIG. 4 with the actuation arm in its stowed position, in accordance with at least one embodiment of the present invention.
FIG. 8B is front elevation view of the improved mounting and actuation device of FIG. 4 with the actuation arm in its stowed position, in accordance with at least one embodiment of the present invention.
FIG. 8C is rear elevation view of the improved mounting and actuation device of FIG. 4 with the actuation arm in its stowed position, in accordance with at least one embodiment of the present invention.
FIG. 8D is a cross-sectional view (through A-A as shown in FIG. 8B) of the improved mounting and actuation device of FIG. 4 with the actuation arm in its stowed position, in accordance with at least one embodiment of the present invention.
FIG. 8E is top view of the improved mounting and actuation device of FIG. 4 with the actuation arm in its stowed position, in accordance with at least one embodiment of the present invention.
FIG. 8F is bottom elevation view of the improved mounting and actuation device of FIG. 4 with the actuation arm in its stowed position, in accordance with at least one embodiment of the present invention.

As in previously described embodiments, mounting and actuation device 200 includes mounting body 220 having a first side wall 222 and a second side wall 224 and at least one mounting surface. First side wall 222 and second side wall 224 define a cavity 223 therebetween (and, more specifically, the side walls define the transverse breadth of cavity 223), as shown in FIG. 5, for receiving actuation arm assembly 240.

In this embodiment, actuation arm 242 is pivotably connected to mounting body 220 at a first, proximal end of actuation arm 242 and has an accessory mounting surface 244 at a second, distal end of actuation arm 242. As in the previously described embodiments, in this embodiment, an accessory is provided that is an electric motor 246 and accessory mounting surface 244 is configured for attachment to electric motor 246. Further, as above, in this embodiment a cutout 227 is provided on at least one of the side walls 222, 224 in order to accommodate electric motor 246 when the actuation arm assembly 240 is in a first, stowed position within cavity 223.

In this embodiment, actuation arm 242 is two, axially aligned and rotatably coupled actuation arms 245, 247 that pivot about their longitudinal axis (as shown by the arrow in FIG. 5) to facilitate the use of electric motor 246 as, for example, a trolling motor.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The embodiments of the invention for which an exclusive property or privilege is claimed are defined as follows:

1. A mounting and actuation device comprising:
   a mounting body adapted to mount the device to an external surface, the mounting body having a first end and a second end, at least one mounting surface, and a first side wall element and a second side wall element, the at least one mounting surface having an upper surface configured to abut the external surface, the at least one mounting surface further having a lower surface, the first side wall element downwardly projecting from the lower surface of the at least one mounting surface, the second side wall element downwardly projecting from the lower surface of the at least one mounting surface, the first side wall element having an inner surface and an outer surface, the second side wall element having an inner surface and an outer surface; and
   an actuation arm operable for movement from a first stowed position to a second actuated position, the actuation arm operably connected to the mounting body at a first proximal end, the actuation arm having a second distal end, the second distal end having a mounting surface adapted to receive an accessory;
   wherein the actuation arm is configured to be generally parallel to the external surface in the first stowed position.

2. The mounting and actuation device of claim 1, wherein the actuation arm is a longitudinally extending actuation arm and the first proximal end of the actuation arm is pivotably connected to pivot means located at one of the first end and the second end of the mounting body.

3. The mounting and actuation device of claim 1, further comprising actuation means for moving the actuation arm from the first stowed position and the second actuated position.

4. The mounting and actuation device of claim 3, wherein the actuation means further comprises:
   a linear actuator having a first end connected to the mounting body and a second end,
   at least one first linkage arm having a first end pivotably connected to the mounting body and a second end; and
   at least one second linkage arm having a first end pivotably connected to the second end of the at least one first linkage arm and a second end pivotably connected to the actuation arm at a position between the first proximal end of the actuation arm and the second distal end of the actuation arm;
   the second end of the linear actuator pivotably connected at a position between the first end of the at least one first linkage arm and the second end of the at least one first linkage arm;
   wherein when the linear actuator is moved from a first compressed position to a second extended position the at least one first linkage arm and the at least one second linkage arm are pivotably moved such that the actuation arm is moved from the first stowed position and the second actuated position.

5. The mounting and actuation device of claim 4, wherein the linear actuator is a hydraulic actuator.

6. The mounting and actuation device of claim 1, further comprising an accessory, the accessory mounted to the mounting surface of the actuation arm.

7. The mounting and actuation device of claim 6, wherein the accessory is an electric motor, such as an electric marine motor, or a hydraulic motor, such as a hydraulic marine motor.

8. The mounting and actuation device of claim 6, wherein the electric or hydraulic motor is pivotable about a longitudinal axis of the actuation arm when not in the first stowed position.

9. The mounting and actuation device of claim 1, wherein the mounting body has at least one upper mounting surface.

10. The mounting and actuation device of claim 1, wherein at least one of the first side wall element and the second side wall element further comprises a cutout to accommodate the accessory when the actuation arm is in the first stowed position.

11. The mounting and actuation device of claim 4, wherein the at least one first linkage arm abuts the pivot means when the actuation arm is in the second actuated position.

12. The mounting and actuation device of claim 2, wherein the mounting body is adapted to mount the device to a surface of a dock, a marine vehicle, a recreational vehicle, a deck, a roof, a fence or a soffit.

13. The mounting and actuation device of claim 12, wherein the surface of a marine vehicle is a surface of the marine vehicle's hull.

* * * * *